United States Patent
Kim et al.

(10) Patent No.: US 10,800,485 B2
(45) Date of Patent: Oct. 13, 2020

(54) BATTERY-INTEGRATED DRIVER OF ELECTRIC BICYCLE

(71) Applicant: H&E CO., LTD, Gumi-si (KR)

(72) Inventors: Gyu Chang Kim, Gumi-si (KR); Do Hwan Lee, Gumi-si (KR); Mun Hyeon Kim, Gumi-si (KR); Yeong Il Yu, Daegu (KR); Nak Hyeon Kwon, Daegu (KR)

(73) Assignee: H&E CO., LTD, Gumi-si (KR)

( * ) Notice: Subject to any disclaimer, the term of this patent is extended or adjusted under 35 U.S.C. 154(b) by 222 days.

(21) Appl. No.: 16/090,438

(22) PCT Filed: Jun. 14, 2017

(86) PCT No.: PCT/KR2017/006201
§ 371 (c)(1),
(2) Date: Oct. 1, 2018

(87) PCT Pub. No.: WO2018/008867
PCT Pub. Date: Jan. 11, 2018

(65) Prior Publication Data
US 2019/0112002 A1  Apr. 18, 2019

(30) Foreign Application Priority Data
Jul. 8, 2016 (KR) .................. 10-2016-0086592

(51) Int. Cl.
*B62M 6/60* (2010.01)
*B62M 6/90* (2010.01)
(Continued)

(52) U.S. Cl.
CPC .............. *B62M 6/90* (2013.01); *B62K 11/00* (2013.01); *B62M 6/50* (2013.01); *B62M 6/60* (2013.01);
(Continued)

(58) Field of Classification Search
CPC .......... B60K 7/0007; B60K 2007/0092; B60K 2007/0038; B60K 2007/0061;
(Continued)

(56) References Cited

U.S. PATENT DOCUMENTS 5,450,915 A * 9/1995 Li ........................... B62M 6/40
180/65.51
5,771,988 A * 6/1998 Kikutani ................ A61G 5/045
180/65.51
(Continued)

FOREIGN PATENT DOCUMENTS

JP           08-048278 A     2/1996
KR    10-2014-0058836 A     5/2014
(Continued)

OTHER PUBLICATIONS

International Search Report for international application No. PCT/KR2017/006201.
PCT Written Opinion for PCT/KR2017/006201.

*Primary Examiner* — Emma K Frick
(74) *Attorney, Agent, or Firm* — Monami Law Group PLLC

(57) ABSTRACT

The present invention relates to a battery-integrated driver for an electric bicycle, and more specifically, related to a driver capable of changing an ordinary bicycle to an electric bicycle. The driver is installed in a hub on the back of a general bicycle and can be housed inside the hub without an external power connection. Thus, a user can easily assemble an electric bicycle and use it conveniently. The battery-integrated driver includes: a wheel hub (H); a rear side chain support (C) and a saddle support (S) of a bicycle which are coupled to each other at the wheel hub (H); a hub (30) provided in the wheel hub (H) and coupled to a wheel rim through spokes, wherein a tire is installed on the wheel rim; a driver (A) provided in the hub (30) and including an
(Continued)

electric motor (660), wherein the electric motor (660) supplies electric power to rotate a wheel; and a battery provided in the driver (A) in a detachable manner and driving the electric motor (660).

10 Claims, 17 Drawing Sheets

(51) Int. Cl.
  *B62M 7/12* (2006.01)
  *B62K 11/00* (2006.01)
  *B62M 6/65* (2010.01)
  *B62M 6/50* (2010.01)
(52) U.S. Cl.
  CPC ................ *B62M 6/65* (2013.01); *B62M 7/12* (2013.01); *B60L 2200/12* (2013.01)
(58) Field of Classification Search
  CPC ........... B60K 2001/045; B60L 2200/12; B60L 2220/44; B60L 2220/46; B62M 6/60; B62M 6/65; B62M 6/90; B62M 7/12
  See application file for complete search history.

(56) References Cited

U.S. PATENT DOCUMENTS

| | | | | |
|---|---|---|---|---|
| 6,100,615 A * | 8/2000 | Birkestrand | ............. | B60L 7/14 310/75 C |
| 6,155,367 A * | 12/2000 | Alber | ..................... | A61G 5/028 180/6.5 |
| 6,347,682 B1 * | 2/2002 | Buchner | ................ | B62M 6/65 180/220 |
| 6,787,951 B2 * | 9/2004 | Maslov | ................ | H02K 1/141 310/216.008 |
| 6,802,385 B2 * | 10/2004 | Pyntikov | ................ | B60L 53/80 180/220 |
| 6,889,809 B2 * | 5/2005 | Yoshiie | .................... | B62M 6/45 192/46 |
| 7,040,440 B2 * | 5/2006 | Kurita | ...................... | B62M 6/60 180/206.5 |
| 7,828,101 B2 * | 11/2010 | Radtke | .................. | B60L 3/0061 180/206.5 |
| 8,636,095 B2 * | 1/2014 | Ito | ............................. | B60L 7/10 180/206.6 |
| 8,640,805 B2 * | 2/2014 | Kuroki | ................ | B60L 15/2054 180/206.1 |
| 8,991,532 B2 * | 3/2015 | Wei | ........................ | A61G 5/047 180/65.51 |
| 9,027,681 B2 * | 5/2015 | Biderman | .............. | B60B 1/003 180/65.51 |
| 9,108,495 B2 * | 8/2015 | Zanfei | .................. | B60K 7/0007 |
| 9,636,992 B2 * | 5/2017 | Biderman | ................ | B60L 3/12 |
| 2012/0168239 A1 * | 7/2012 | Gardes | ................ | B60K 7/0007 180/65.51 |
| 2016/0068223 A1 * | 3/2016 | Zanfei | ..................... | B62M 6/50 301/6.5 |
| 2016/0075177 A1 | 3/2016 | Biderman et al. | | |
| 2017/0259663 A1 * | 9/2017 | Chan | ........................ | B60K 1/04 |
| 2018/0056774 A1 * | 3/2018 | Chan | .................... | B62M 11/16 |
| 2019/0160937 A1 * | 5/2019 | Yilma | .................... | B60L 50/64 |
| 2019/0185106 A1 * | 6/2019 | Lin | ........................ | B60L 53/305 |
| 2019/0193811 A1 * | 6/2019 | Kim | ........................ | B62M 6/65 |

FOREIGN PATENT DOCUMENTS

| | | |
|---|---|---|
| KR | 10-2014-0072335 A | 6/2014 |
| KR | 10-1429443 B | 8/2014 |
| KR | 10-1530171 B | 6/2015 |
| KR | 10-2016-0015754 A | 2/2016 |

* cited by examiner

BATTERY-INTEGRATED DRIVER OF ELECTRIC BICYCLE

CROSS REFERENCE

This application is a national stage application of PCT/KR2017/006201 filed on Jun. 14, 2017, which claims priority of Korean patent application number 10-2016-0086592 filed on Jul. 8, 2016. The disclosure thereof is incorporated herein by reference in its entirety.

TECHNICAL FIELD

The present invention relates to a battery-integrated driver for an electric bicycle, and more specifically, related to a driver capable of changing an ordinary bicycle to an electric bicycle. The driver is installed in a hub on the back of a general bicycle and can be housed inside the hub without an external power connection. Thus, a user can easily assemble an electric bicycle and use it conveniently.

BACKGROUND OF ART

Generally, a bicycle that uses human power is one of transportation for a short distance travel. It has been used from past to present. In recent years bicycling is not only for short distance transportation but also a hobby for health or well-being.

In addition, in recent years, bicycle lanes have been built nationwide to promote bicycling for public health and to help tourist use bicycles to get to tourist destinations. However, it is not easy for ordinary people to have a long distance trip using a general bicycle. A long distance trip using a general bicycle is physically burdensome to ordinary people.

Various forms of technology have been used to facilitate a long distance travel and reduce physical exhaustion.

For example, see Korean Patent Registration No. 10-1429443 (Registration Date 2014 Aug. 6) and Korean Patent Registration No. 10-1530171 (Registration Date 2015 Jun. 15).

The above mentioned conventional technologies are related to an electric bicycle and driver for electric bicycles.

The electric bicycle includes: a motor providing power; a motor wire connected to the motor; and a wiring device provided around the motor for wiring the motor wire. The wiring device includes: a shaft including a wiring passage of the motor wire; and a shaft cap engaged with the shaft. The wiring passage includes a wiring hole and a slit. The wiring hole is formed in the center of the shaft and arranged in a longitudinal direction. The slit is formed on an outer peripheral surface of the shaft and opened from one end of the shaft toward the direction of the motor to guide the motor wire to the outside of the shaft, thereby being connected with the wiring hole. The shaft cap is inserted longitudinally into the shaft through the wiring hole to reinforce strength of the shaft.

Also is disclosed a driver for electric bicycles including: a motor for generating a rotational force for driving wheels of an electric bicycle; a reduction gear unit having multiple gears for reducing the rotational force generated from the motor; and a wheel housing provided on the wheels of the electric bicycle to contain the motor and the reduction gear unit. An output terminal for outputting a decelerated rotational force from the reduction gear unit is coupled to the wheel housing to transmit the rotational force to the wheel housing. The motor includes a rotor and a stator. The rotor has a hollow center. The stator is spaced apart from the rotor by a predetermined distance and surrounding the rotor. A first space is formed in the stator by a first partition wall which extends to the hollow center of the rotor. A second space is formed by a second partition wall protruding along an edge of an outer peripheral surface.

However, the above-described conventional techniques have a problem in that a power source such as a battery, which is required for the drivers, is separately installed onto the bicycle. Alternatively, a separate space is provided in which an external cable-type power source transmission line is placed. The external cable-type power source transmission line is connected to the internal driver.

To install such an external power source line, a separate bracket should be provided to attach it to a bicycle frame or a wire is necessary to fix it to the bicycle body frame.

In addition, a battery capable of supplying a large power to various types of general bicycles must be securely installed to prevent an accident due to an external shock or interference of electric wires. Such installation job requires a lot of time. Such issue has been wanted to be solved.

DETAILED DESCRIPTION OF THE INVENTION

Problem to be Solved

The present invention is provided to solve the above mentioned problems. The present invention provides a battery-integrated driver which is easily installed on a regular bicycle and makes it serve as an electric bicycle. The objective can be achieved by merely replacing a hub. It requires neither separate battery mounting portion nor an outside storage portion for storing a battery. A battery can be installed in a detachable manner inside a battery-integrated driver, thus minimizing user's burden for installation and guaranteeing stability and durability at the same time.

To achieve the above objectives, a battery-integrated driver according to the present invention comprises: a wheel hub (H); a rear side chain support (C) and a saddle support (S) of a bicycle which are coupled to each other at the wheel hub (H); a hub (30) provided in the wheel hub (H) and coupled to a wheel rim through spokes, wherein a tire is installed on the wheel rim; a driver (A) provided in the hub (30) and including an electric motor (660), wherein the electric motor (660) rotates a wheel by electric power; and a battery provided in the driver (A) in a detachable manner and driving the electric motor (660).

Advantages of Invention

The above-described battery-integrated driver of the electric bicycle according to the present invention has at least the following advantages. The driver can be firmly and safely installed inside the hub and protected from shaking or external impact. Installation is easy and simple. Installation is made by simply replacing the hub. No additional parts is necessary to be attached to a conventional ordinary bicycle. No separate wiring is necessary. Thus, no safety issue exists due to a fire or an explosion caused by disconnection of a wire due to impact or interference. In addition, it is very easy, simple and safe to replace the battery.

SUMMARY OF INVENTION

Figure 1:
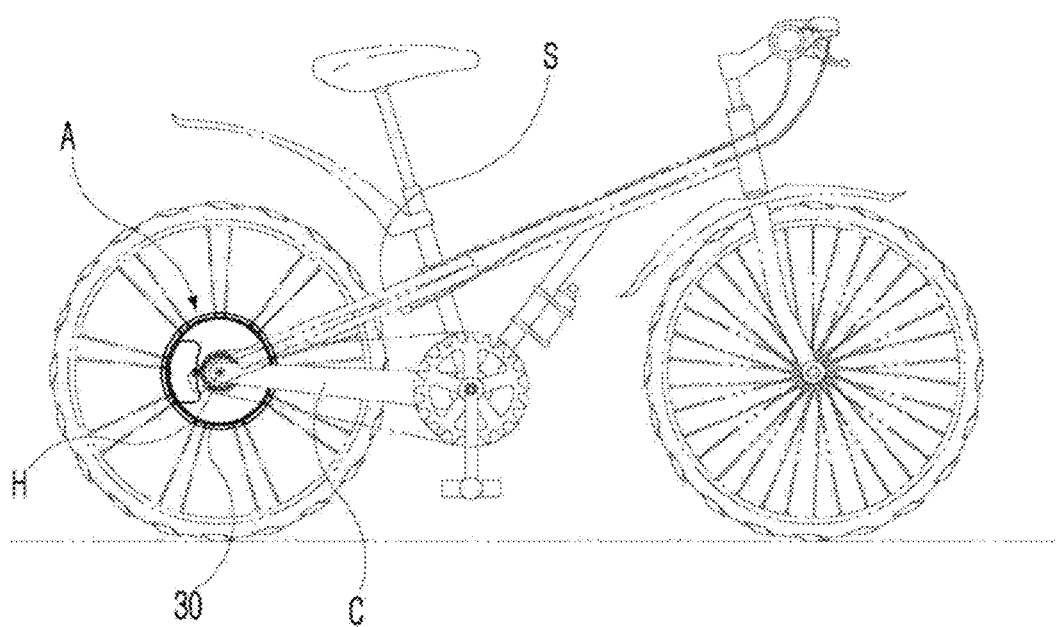
FIG. 1 is a diagram showing an electric bicycle according to an embodiment of the present invention.
Figure 2:
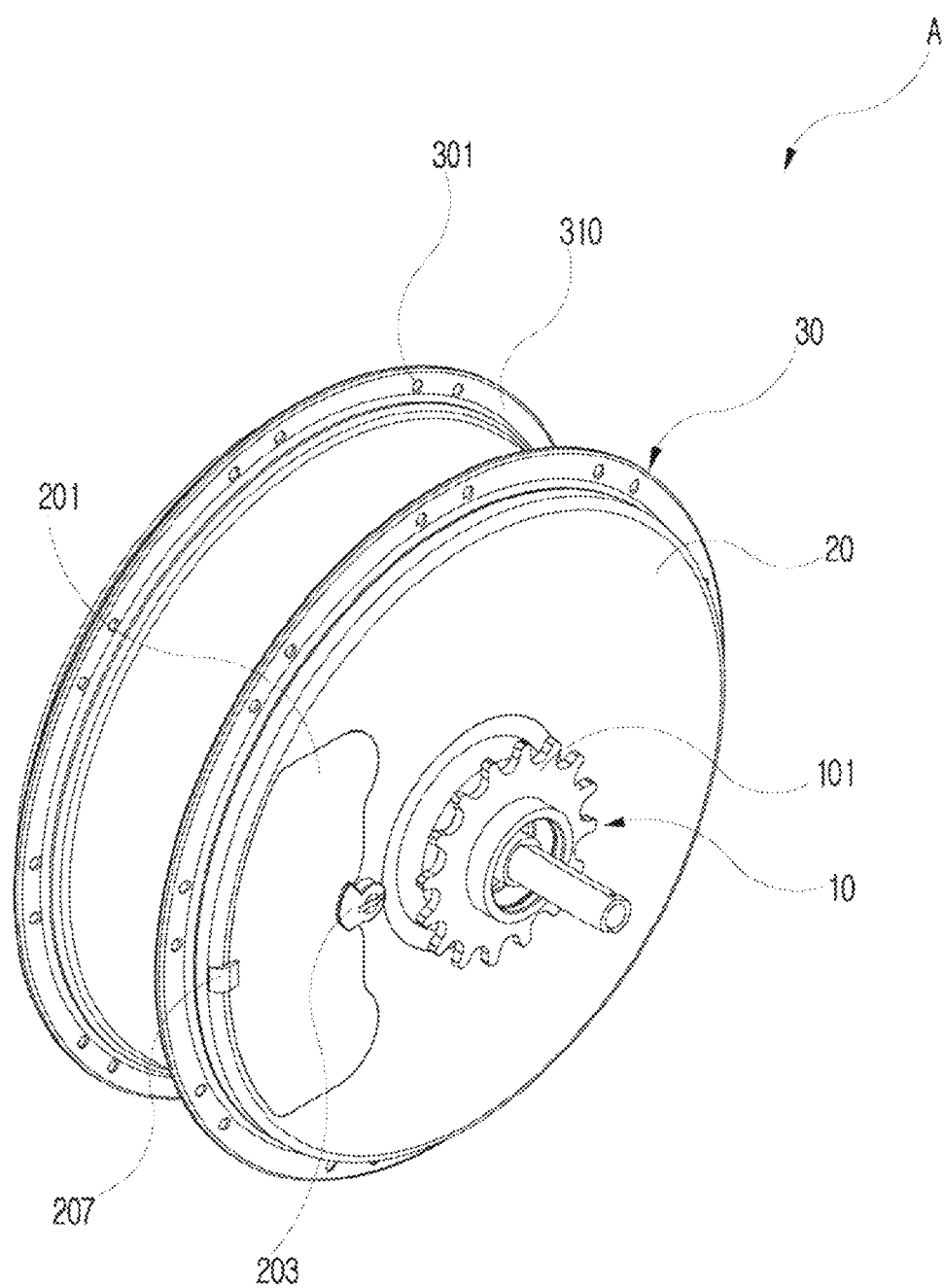
FIG. 2 is a diagram showing a driver according to an embodiment of the present invention.
Figure 3:
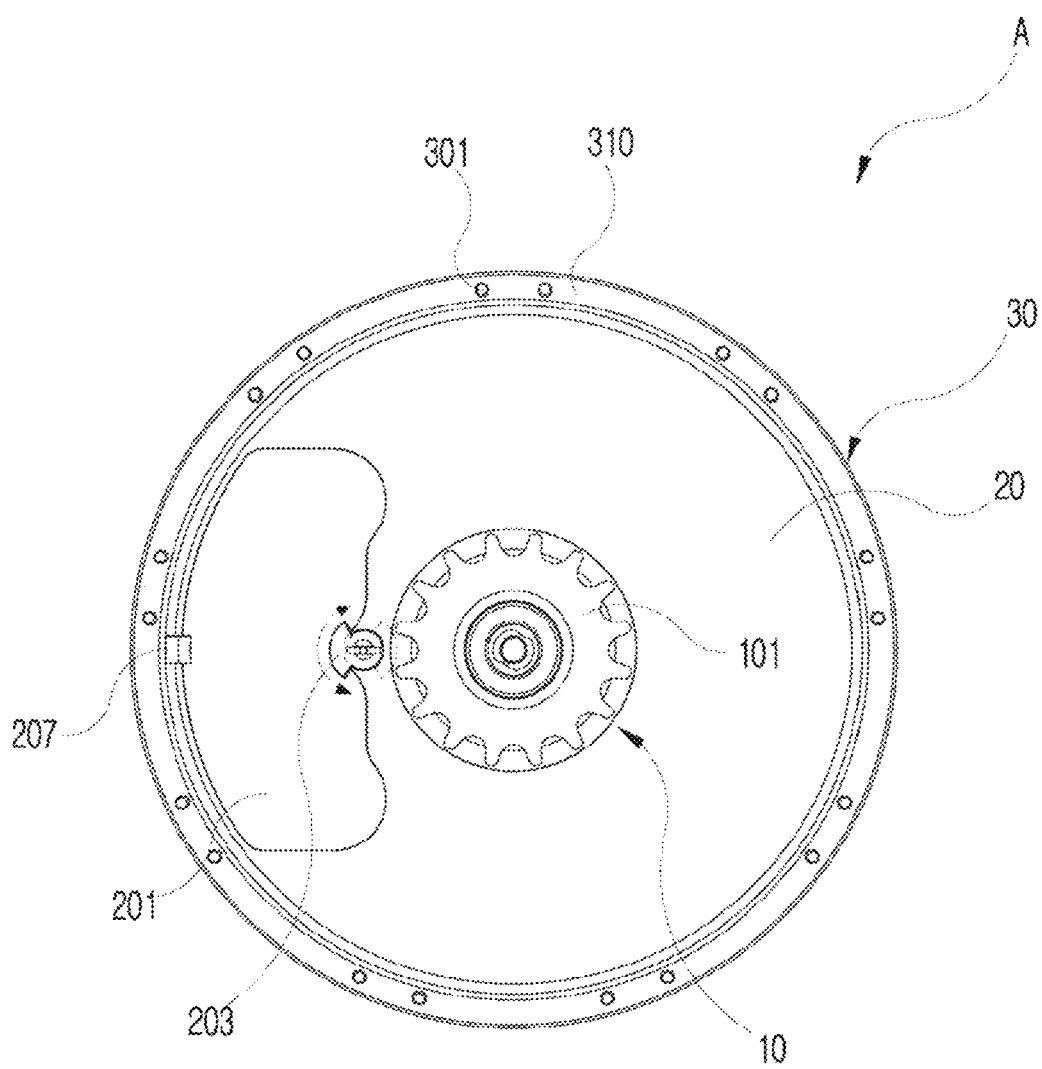
FIG. 3 is a front view of the driver according to an embodiment of the present invention.

A battery-integrated driver for electric bicycles according to embodiments of the present invention will be described in more detail with reference to the accompanying drawings.

According to an embodiment of the present invention, a battery integrated driver includes: a wheel hub (H); a rear side chain support (C) and a saddle support (S) of a bicycle which are coupled to each other at the wheel hub (H); a hub (30) provided in the wheel hub (H) and coupled to a wheel rim through spokes, wherein a tire is installed on the wheel rim; a driver (A) provided in the hub (30) and including an electric motor (660), wherein the electric motor (660) supplies electric power to rotate a wheel; and a battery provided in the driver (A) in a detachable manner and driving the electric motor (660).

The driver (A) includes: a ratchet unit (10) detecting and inputting an operation signal generated by a forward/reverse rotation of a bicycle pedal; a cover plate (20) having a receiving block (215), wherein an inner circumference of the ratchet unit (10) is rotatably coupled with the receiving block (215) of the cover plate (20); a built-in case (50) provided on a first side of the cover plate (20) and housing a battery (40) and a control module board (510), wherein the battery (40) includes a first battery (410) and a second battery (420), wherein the cover plate (20) is easily opened and closed so that the battery (40) is installed in the built-in case (50) in attachable and detachable manner; a control module board (510) installed in the built-in case (50) and including a control program, wherein the control program senses the operation signal of the ratchet unit (10) to control the electric motor (660); a motor unit (60) provided on a first side of the built-in case (50) and generating and transmitting power to the motor (660) for deceleration, stop, and acceleration, wherein the cover plate (20) and the latchet unit (10) are coupled to a second side of the built-in case (50); a main body (380) provided on the first side of the built-in case (50) and over the motor unit (60); a clutch (700) provided in the main body (380); and an outer gear (395) provided in the main body (380) and rotatably engaged with the motor unit (60).

The ratchet unit (10) may include: a ratchet block (102) having a first through hole (151); a sprocket (101) fixedly installed on a first side of the ratchet block (102); one or more pair of insertion groove (111) and operation groove (118) which is formed on an inner circumference of the sprocket (101); an elastic plate (112) and a pawl (113) which are formed in the insertion groove (111) and engageable with each other; a contactless electric signal conversion unit (104) inserted into a center of the sprocket (101); and a ratchet gear shell (103) fitted to the pawl (113) and selectively engageable with the pawl (113).

The cover plate (20) may include: a rotary plate (250); the receiving block (215) formed in the rotary plate (250) and receiving a ratchet near shell (103) of the ratchet unit (10); a threaded portion (204) formed on an outer circumference of the rotary plate (250); a detachable groove (209) formed at an eccentrical location of the threaded portion (204); a latching protrusion (207) and a latching lever (203) formed an the detachable groove (209); and a detachable battery protecting lid (201) engageable with the latching protrusion (207) and the latching lever (203).

The built-in case (50) may include: a partition plate (504) securely accommodating the control module board (510); a holding plate (503) securely accommodating the battery (40); one or more fixing bracket (501, 502) provided adjacent to the holding plate (503) to prevent detachment of the battery (40); a cooling space groove (520) formed adjacent to the partition plate (504); and heat dissipation holes (522) formed in a wall surface (521) of the cooling space groove (520).

The contactless electric signal conversion unit (104) is coupled with the ratchet block (102) and controls an operation of the electric motor (660) using the control module board (510) of the driver (A) in accordance with the operation signal of the forward reverse rotation of the bicycle pedal. N poles and S poles, which are firmed of permanent magnet blocks, are provided on an inner circumference of the first through hole (151) of the ratchet block (102), arranged in an alternate manner, and spaced apart from each other by a predetermined distance.

The contactless electric signal conversion unit (104) converts a stop signal, a deceleration signal, or an acceleration signal and transmits the converted signal to the control module board (510) depending on operating environment and operating requirements using an optical sensor, a ultrasonic sensor, or a proximity sensor.

The control module board (510) may include: a motor control unit (not shown) controlling driving of the hub (30) which is rotated by the electric motor unit (60); a wireless communication unit (not shown) transmitting an operation status of the electric motor unit (60) and operation information of the control module board (510) via a remote local Bluetooth network or a WiFi network; and the control program, wherein the control program checks and diagnoses a status of the motor control unit and a status of the wireless communication unit.

The motor control unit (not shown), the wireless communication unit (not shown), and the control program are wirelessly controlled by a mobile or a tablet device using the wireless communication unit (not shown).

The electric motor unit (60) may include: a support shaft rod (601) formed in a hollow tube shape; a rotary shaft (602) provided on the support shaft rod (601) in a stepped shape; an engraved portion (603) provided adjacent to the rotary shaft (602) to firm a sensor fixing groove (604), a second through hole (604a) formed in the sensor fixing groove (604); a hall sensor (610) inserted low the second through hole (604a) and connected to a first end of a wiring (611); the control module board (510) coupled to a second end of the wiring (611); the electric motor (660) coupled to the support shaft rod (601); a rotary gear (605) provided at a center region of the electric motor (660); a planetary near (630), wherein the rotary gear (605) and the planetary gear (430) are arranged side by side; and a fixing shaft rod (640) fixed to the planetary gear (630).

The supporting shaft rod (601) includes an external connection terminal (800). The external connection terminal (800) may be: a battery charging terminal (not shown) charging the battery (40) by an external power source; a wireless communication unit antenna (not shown) connected with the mobile or the tablet device for external remote control; or a terminal (not shown) for diagnosing a state of the electric motor unit (60) and inputting/outputting the control program.

The hub (30) may include: the main body (380) including a fixing bracket (310); an engaging groove (302) formed on the fixing bracket (310) and engageable with a threaded portion (204), wherein the threaded portion (204) is formed on an outer circumference of the rotary plate (250) of the cover plate (20); spoke fixing grooves (301) formed along an outer circumference of the coupling groove (302) and arranged in a circular manner; a rotary plate (390) forming a first side of the main body (380); and a clutch (700) shafted and fixed to the rotary plate (390) and including a guide rail (702) and one or more rollers (701). The one or more rollers (701) moves along a guide rail (702). The outer near (395), which transmits power, and a planetary gear (605) of the motor unit (60) rotate or idle while being engaged with an outer circumference of the clutch (700).

BEST MODE OF THE INVENTION

Hereinafter, a battery-integrated type driver of the electric bicycle according to embodiment of the present invention will be described in more detail.

As shown in FIG. 1, the hub (30) is installed between wheel hubs (H) where the rear side chain support (C) and the saddle support (S) intersect with each other.

The driver (A) is installed in the hub (30) in a detachable manner so that a tire, which is installed over a rim and connected to the hub (30), can be freely and independently driven by the electric motor (660) using an integrated power source.

The motor unit (60), the detachable battery (40) and the control module board (510) are accommodated in the built-in case (50) at the same time. A cover plates (20) provided on both sides of the built-in case (50) is coupled with the hub (30) so that the hub (30) can be rotated smoothly.

The support shaft rod (601) and the fixing shall rod (640) provided at both sides of the motor unit (60) are fixed to the both side wheel hubs (H) of the chain support (C).

In addition, the battery (40) serving as a power source is attached inside the hub (30) in a detachable manner. Thus, there is no need to separately install the battery on outside the hub (30) and then connect it inside, enhancing the appearance design, safety and efficiency of the product.

As shown in FIGS. 13 to 16, the sprocket (101) is inserted into the ratchet block (102) having the through hole (151) to receive forward and reverse rotation of the bicycle pedal and the user's manipulation commands. Upon the user's pedaling, the sprocket (101) connected to a chain is operated. Specifically, the elastic plate (112) and the pawl (113), which are provided in the insertion groove (111) having the operation groove (118), intersect with each other to generate a constant elastic force.

The contactless electric signal conversion unit (104) is located at an inner center of the sprocket (101) and generates a constant signal without friction or contact with a product.

The pawl (113) is inserted in the operation groove (118) and is operated by selective engagement. That is, the sprocket (101) is rotated and idled by the ratchet gear shell (103).

The ratchet gear shell (103) of the ratchet unit (10) is inserted into the receiving block (215) of the cover plate (20) and integrally joined with the hub (30). The ratchet gear shell (103) rotates and idles the cover plate (20) so that the rotation of the wheel can be performed with no intervention of the motor unit (60).

When the ratchet unit (10) is independently operated by a user, idling is performed by the clutch (700) installed inside the outer gear (395) so that there is no rotational resistance of the motor unit (60).

When the motor unit (60) is rotated by the electric motor (660), the ratchet gear shell (103) of the ratchet unit (10) idles for a smooth rotation of the hub (30).

The clutch (700) is provided in the hub (30) for power transmission and idling.

The rotary plate (390) rotates in accordance with rotation of the outer gear (395).

The clutch (700) helps the rotary plate (390) to smoothly rotate at the time of idling.

One or more rollers (701) are provided in the clutch (700) along the guide rail (702).

Figure 4:
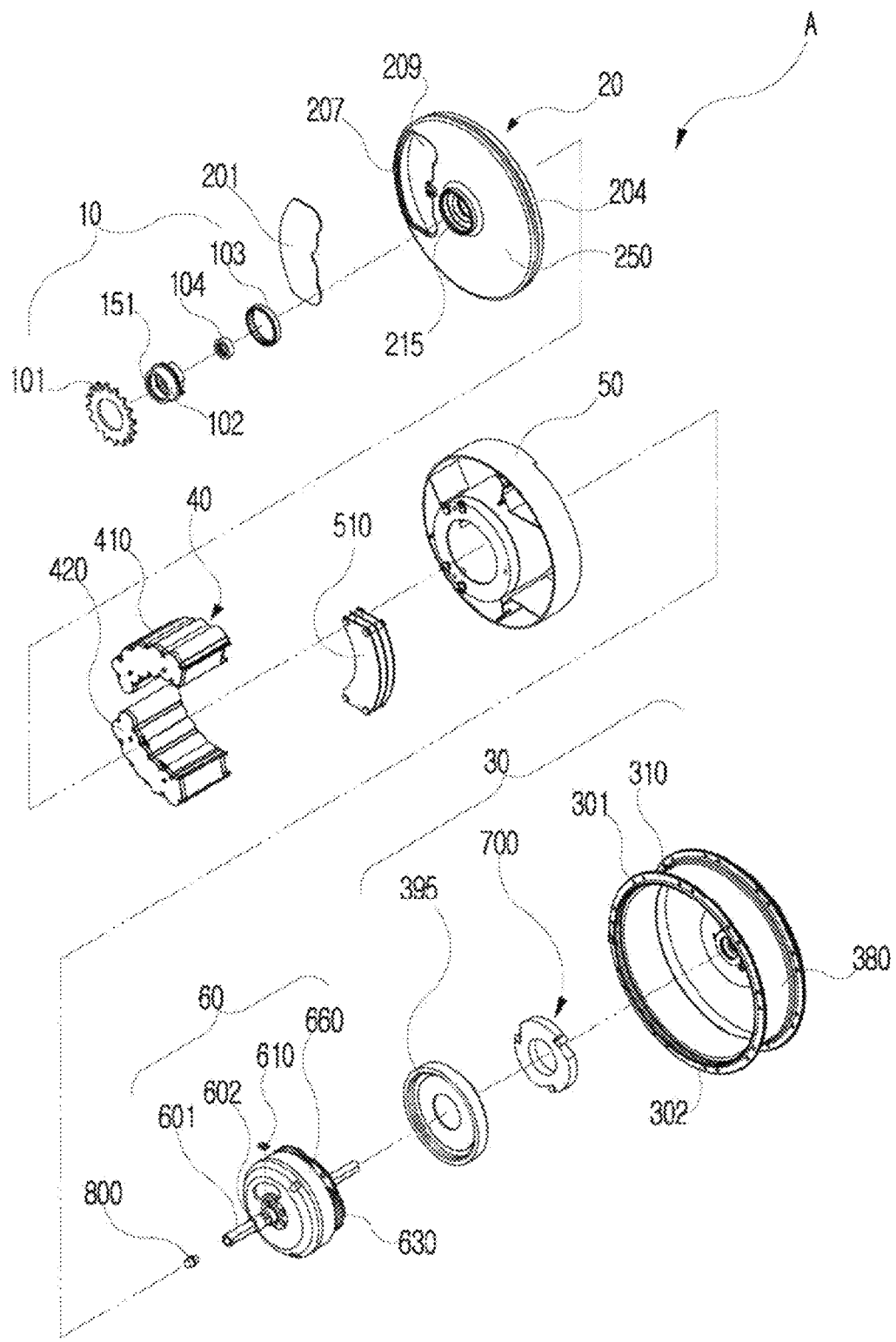
FIG. 4 is an exploded assembly view of the driver according to an embodiment of the present invention.

As shown in FIG. 4, the rotary plate (250) includes a receiving block (215) for receiving the ratchet gear shell (103) of the ratchet unit (10). The detachable battery (40) and the control module board (510) are accommodated in a detachable manner. The threaded portion (204) is formed on an outer circumference of the rotary plate (250) for fixing the rotary plate (250) to the hub (30). A left-hand tab or a right-hand tab can be used to fix the rotary plate (250) and to prevent the rotary plate (250) from being separated during operation.

Figure 10:
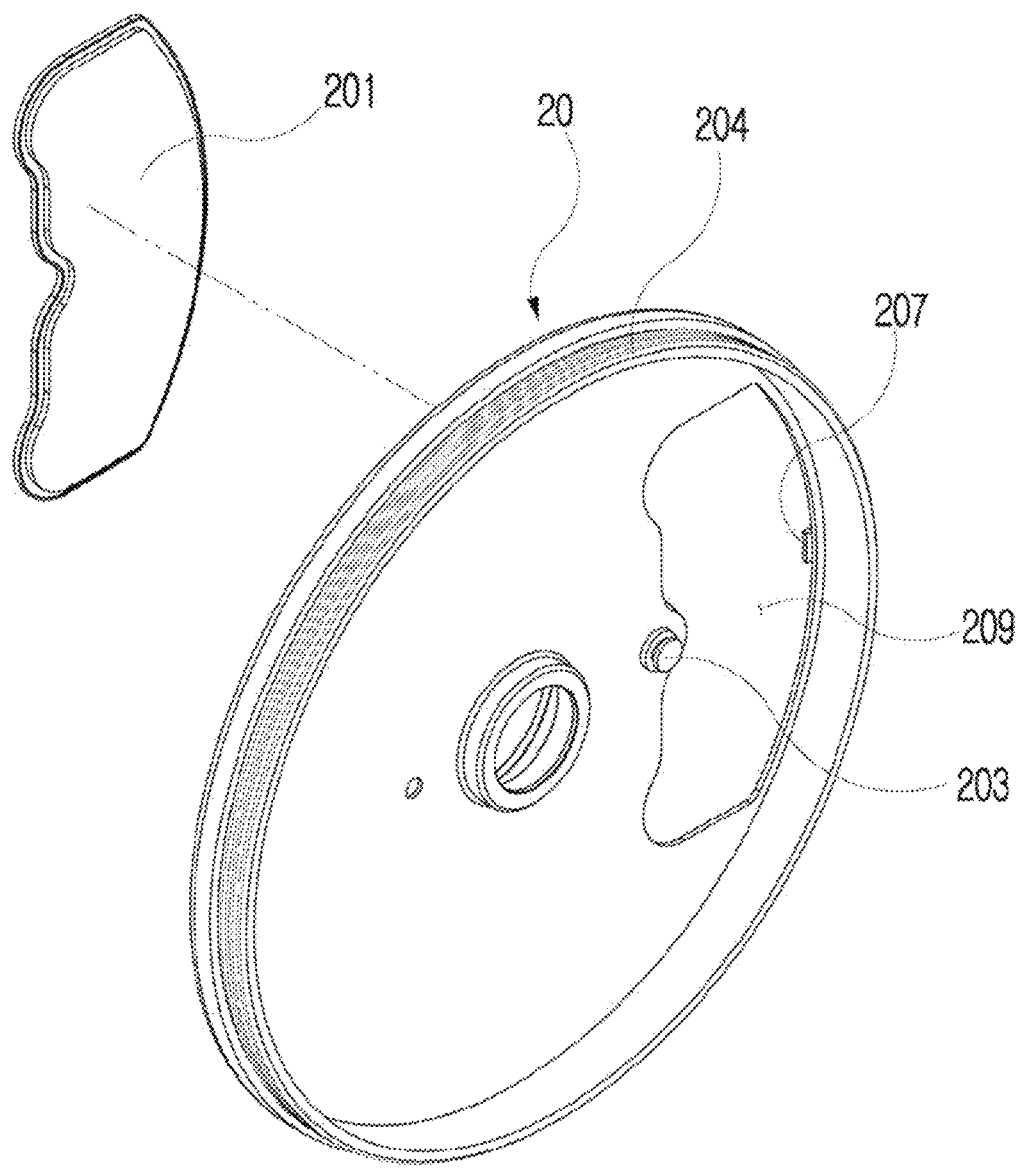
FIG. 10 is a cover plate and a lid fitting the cover plate according to an embodiment of the present invention.

As shown in FIG. 10, the detachable groove (209) is formed in the rotary plate (250) at an eccentrical location when measured in reference with a center of the threaded portion (204). The detachable groove (209) is shaped to accommodate the control module board (510) and the detachable battery (40) in such a manner of minimizing unnecessary openings or gaps.

Once the detachable battery (40) and the control module board (510) are inserted through the detachable groove (209), the protecting lid (201) is fixed by the latching protrusion (207) and the latching lever (203) so that the detachable groove (209) can be securely sealed.

In the cover plate (20), the threaded portion (204) formed on the rotary plate (250) is engaged with and fixed to the coupling groove (302) of the hub (30).

The built-in case (50) is provided between the cover plate (20) and the hub (30).

The built-in case (50) includes a partition plate (504) to receive the control module board (510) and prevent the control module board (510) from being separated and shaking.

The fixing plate (503) is formed spaced apart from the partition plate (504) to house the detachable battery (40). The detachable battery (40) is inserted into the partition plate (504) and fixed by the fixing brackets (501, 502) to prevent dislocation of the detachable battery (40).

The cooling space groove (520) has a predetermined area and is formed on an outer surface of the partition plate (504). Multiple heat dissipation holes (522) are formed in the wall surface (521) of the cooling space groove (520) for efficient cooling and dissipate heat generated from the control module board (510) into the hub (30) and the cover plate (20). The hub (30) and the cover plate (20) may be made of an aluminum alloy with a high thermal conductivity.

The first battery (410) and the second battery (420) are inserted into the built-in case (50) through the detachable groove (209) of the cover plate (20).

The control module board (510) may be accommodated in the control module separating prevention partition plate (504). The control module board (510) may include the control unit (not shown), the wireless communication unit (not shown), and the state diagnostic program.

The external connection terminal (800) is provided on one end or both ends of the support shaft rod (601) to perform charging, connection with external devices, and status diagnosis. The external connection terminal (800) may include: the battery charging terminal (not shown) charging the control module board (510) or the detachable battery (40) by an external power source; the wireless communication unit antenna (not shown) connected with mobile or tablet devices for external remote control; and the terminal (not shown) diagnosing a state of the electric motor unit (60) and inputting/outputting a program.

Figure 5:
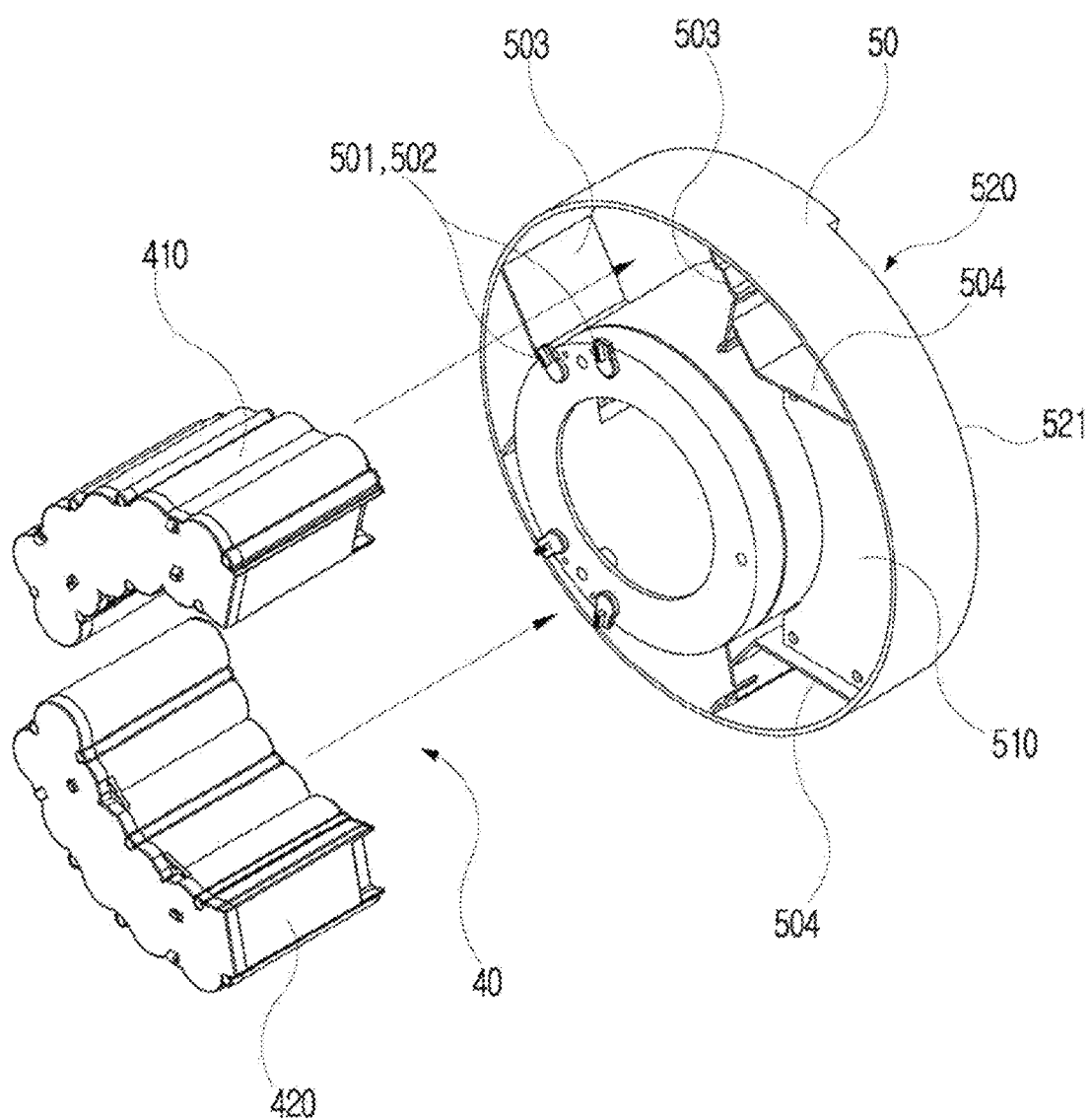
FIG. 5 illustrates a detachable battery inserted into a built-in case according to an embodiment of the present invention.
Figure 6:
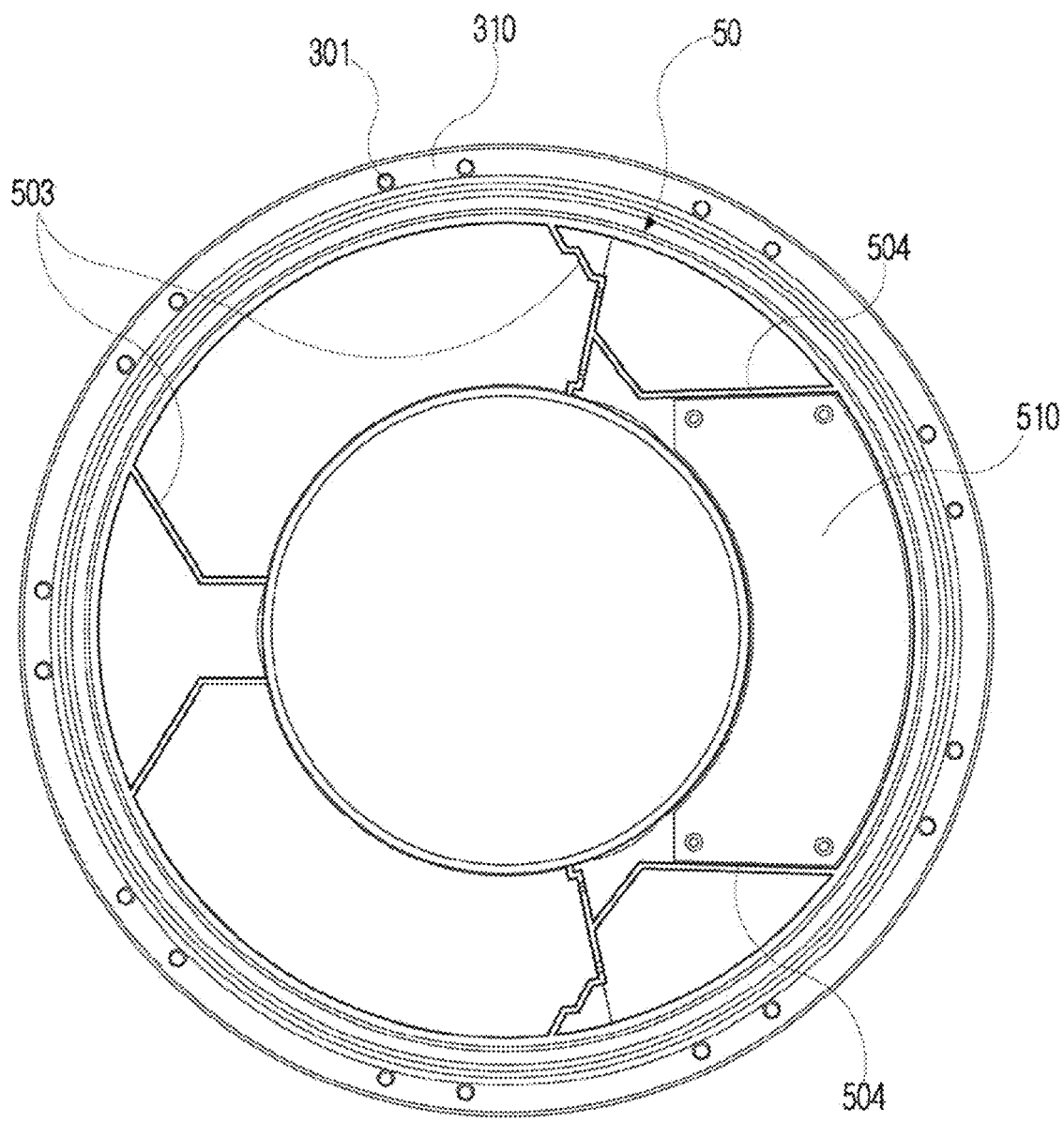
FIG. 6 is a side cross-sectional view of a built-in case inserted into a hub according to an embodiment of the present invention.
Figure 7:
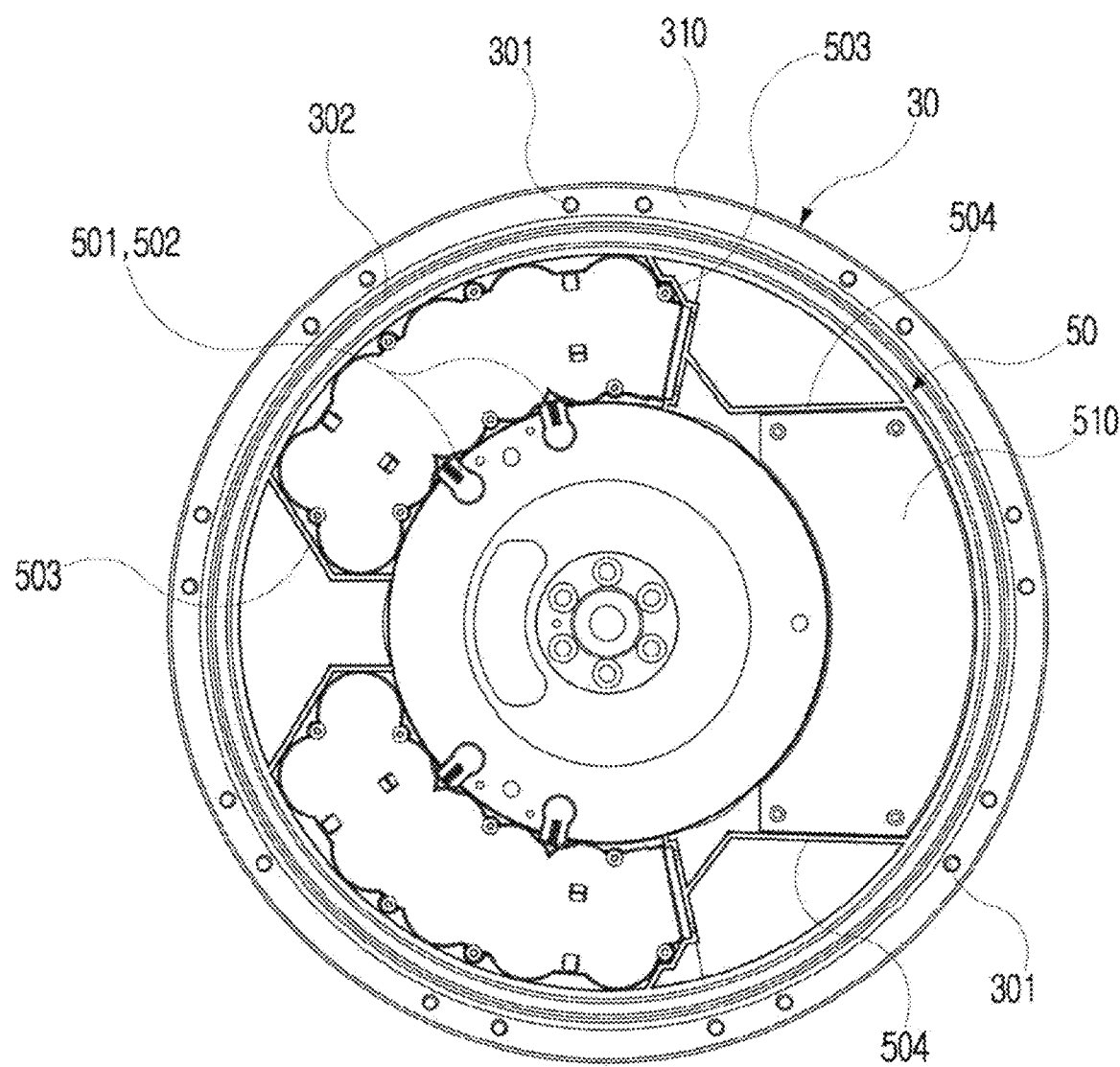
FIG. 7 is an exemplary view showing a state in which a detachable battery is inserted into a built-in case according to an embodiment of the present invention.
Figure 8:
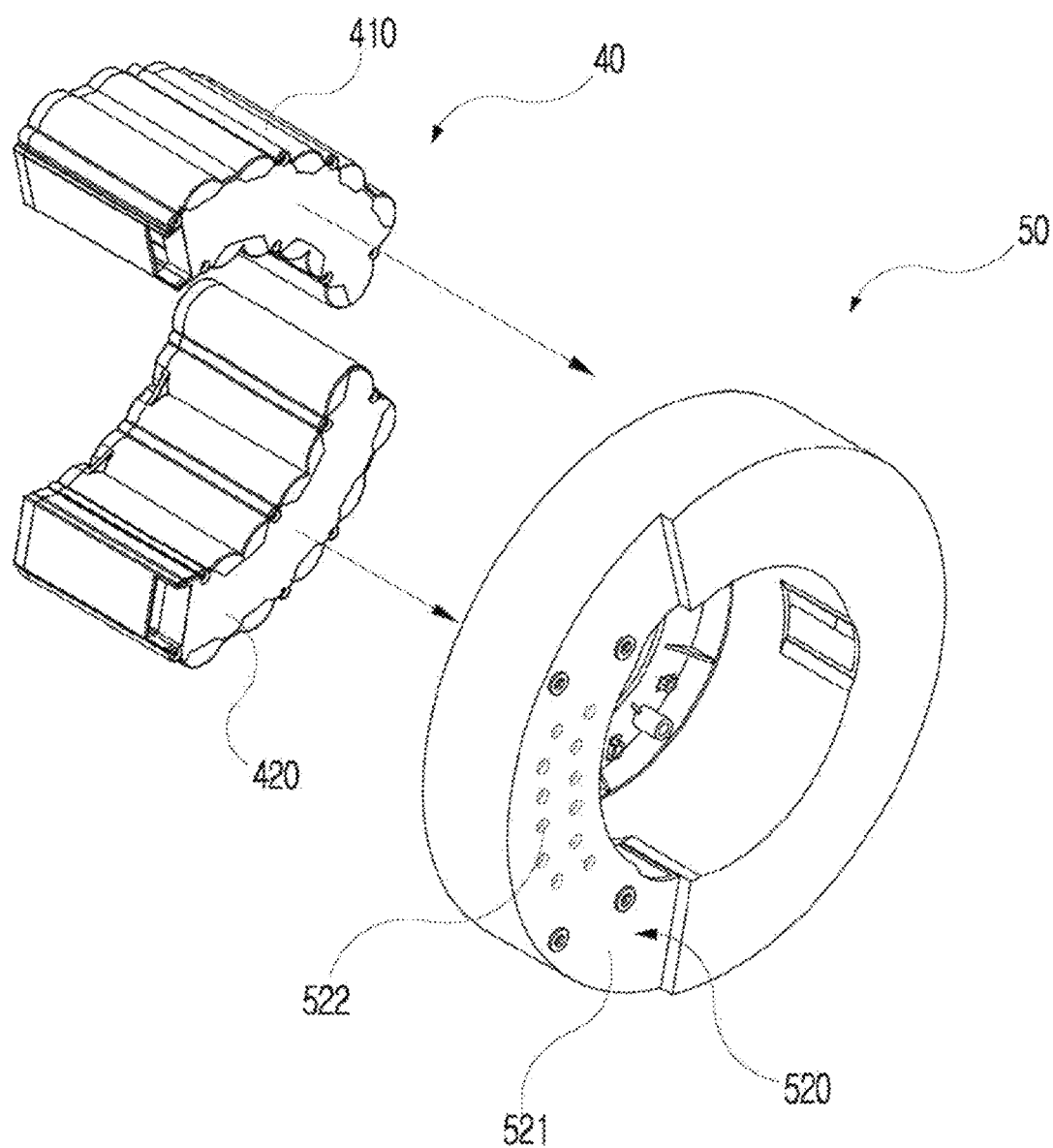
FIG. 8 is a detachable battery inserted into a built-in case according to another embodiment of the present invention.
Figure 9:
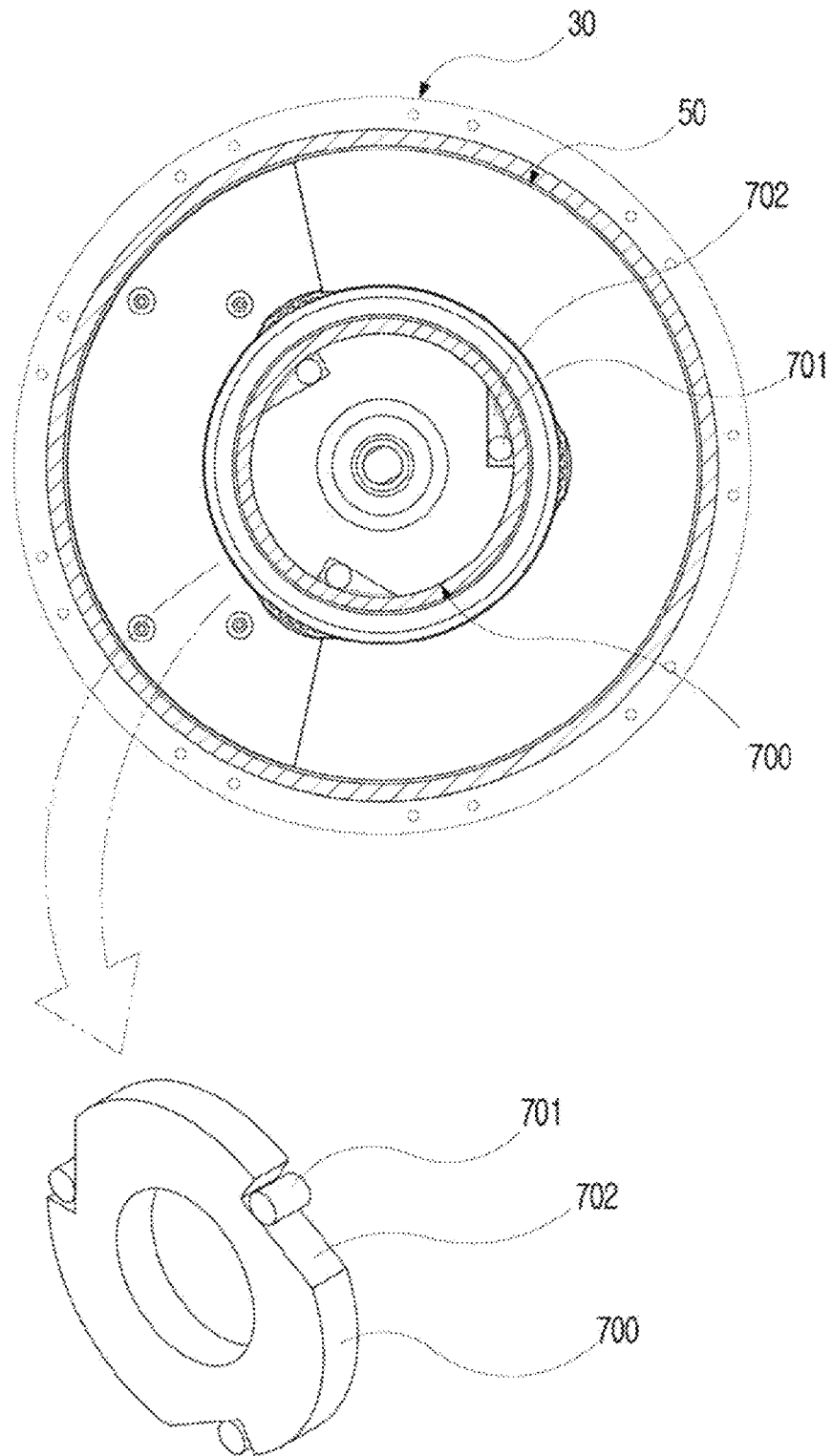
FIG. 9 is a rear view of a built-in case according to an embodiment of the present invention.

As shown in FIG. 5, the control module board (510) is installed in the built-in case (50) and has a control program. The control program receives an operation signal from the ratchet unit (10) and performs a control function.

The motor unit (60) is controlled by the control module board (510) and includes the rotary shaft (602).

The rotary shaft (602) is provided on the support shaft rod (601).

The hall sensor (610) is attached by a sensor fixing groove (604) having a through hole (604a) formed in a engraved portion (603) formed on the other side of the rotary shaft (602). The engraved portion (603) is provided adjacent tea the rotary shaft (602) to form a sensor fixing groove (604). The second through hole (604a) is formed in the sensor fixing groove (604). The hall sensor (610) is fixed by the sensor fixing groove (604).

The wiring (611) of the hall sensor (610) provided in the through hole (604a) is connected to the control module board (510) along the through hole (604a) of the supporting shaft rod (601).

The electric motor (660) is coupled to a first end of the support shaft rod (601).

The rotary gear (605) is formed at the center of the electric rotor (660).

A constant torque is generated as the rotary gear (605) rotates and decelerates the planetary gear (630). A rotational force obtained by the torque rotates the outer gear (395) of the hub (30).

The support shaft rod (601), the motor (660), and the planetary gear (630) are integrated together to form the fixing shaft rod (640). The fixing shaft rod (640) is fixed to each side of the chain support unit (C).

The contactless electric signal conversion unit (104) integrally inserted into the ratchet unit (10), measures the rotation of the wheel in real time using the signal generated by the N-poles and the S-poles so that the motor (660) is rotated according to the user's operating condition. The N poles and S poles are formed of permanent magnet blocks and arranged in an alternate manner to generate the signal in accordance to forward/reverse rotation of the user's pedal movement.

In an alternative embodiment, the contactless electric signal conversion unit (104) may be replaced with an optical sensor, a ultrasonic sensor, or a proximity sensor depending on an operating environment.

Figure 11:
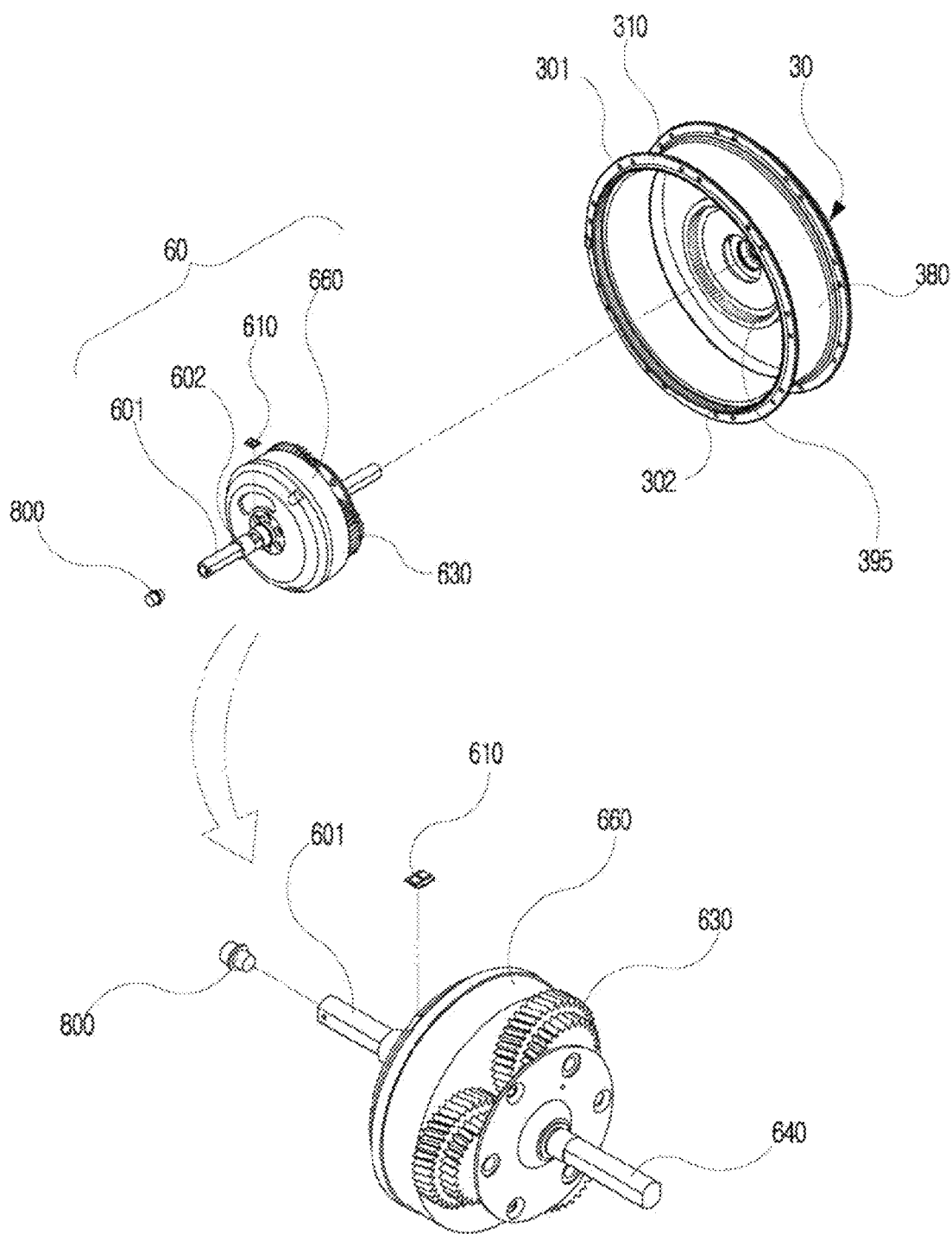
FIG. 11 is an exploded view of a motor unit and a clutch unit according to an embodiment of the present invention.
Figure 12:
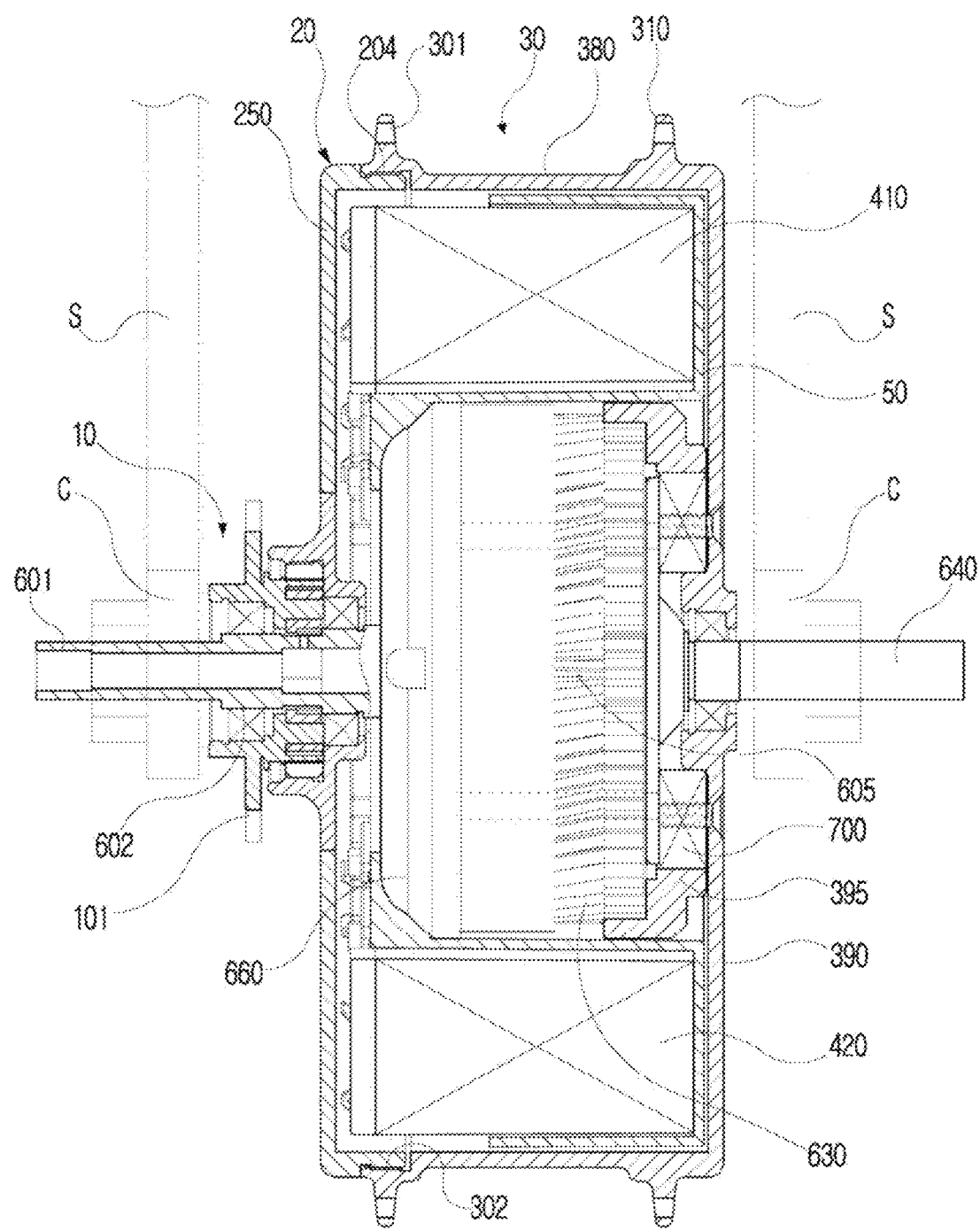
FIG. 12 is a side cross-sectional view of a driver according to an embodiment of the present invention.
Figure 13:
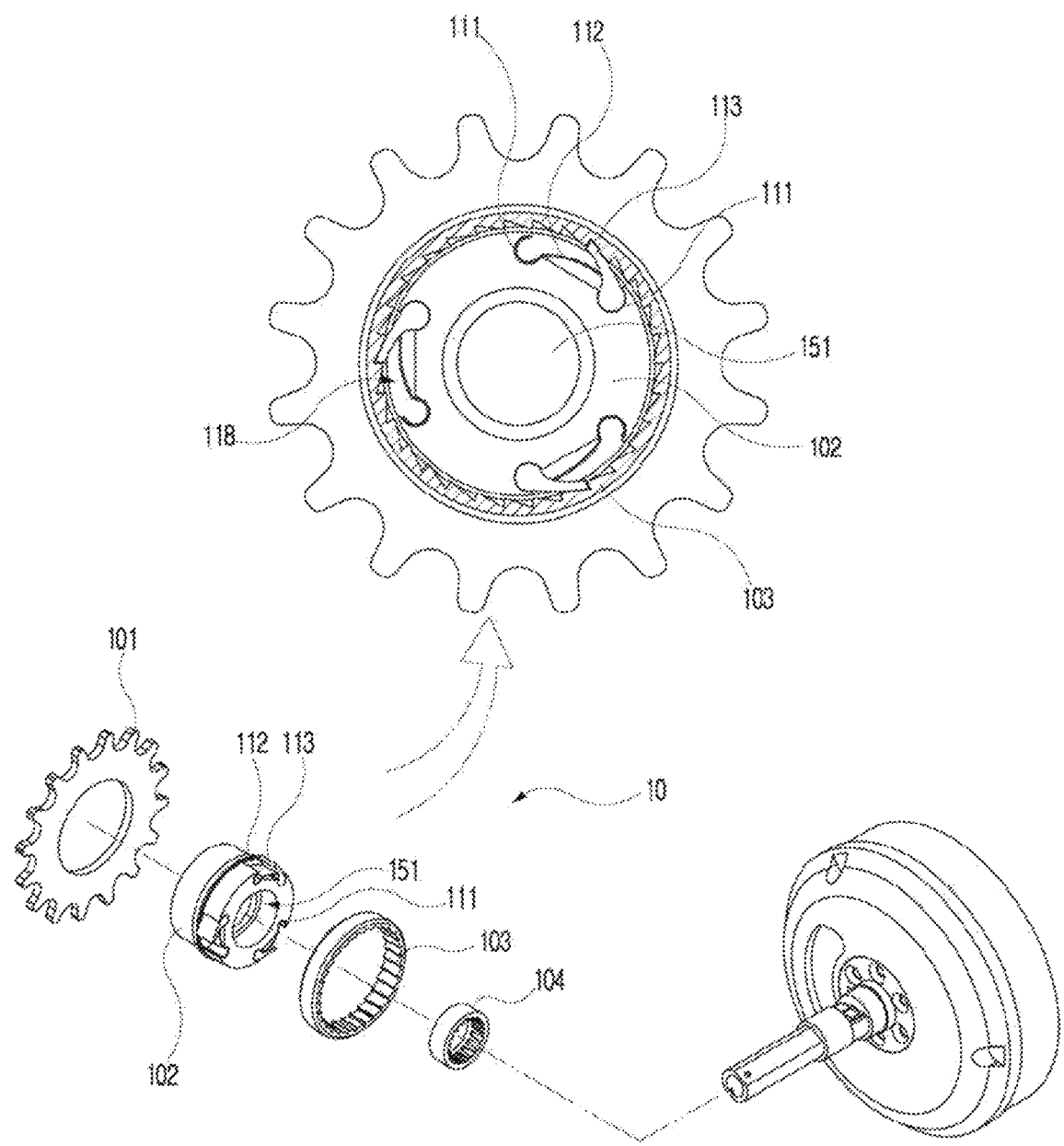
FIG. 13 is an exploded view of a ratchet unit according to an embodiment of the present invention.
Figure 14:
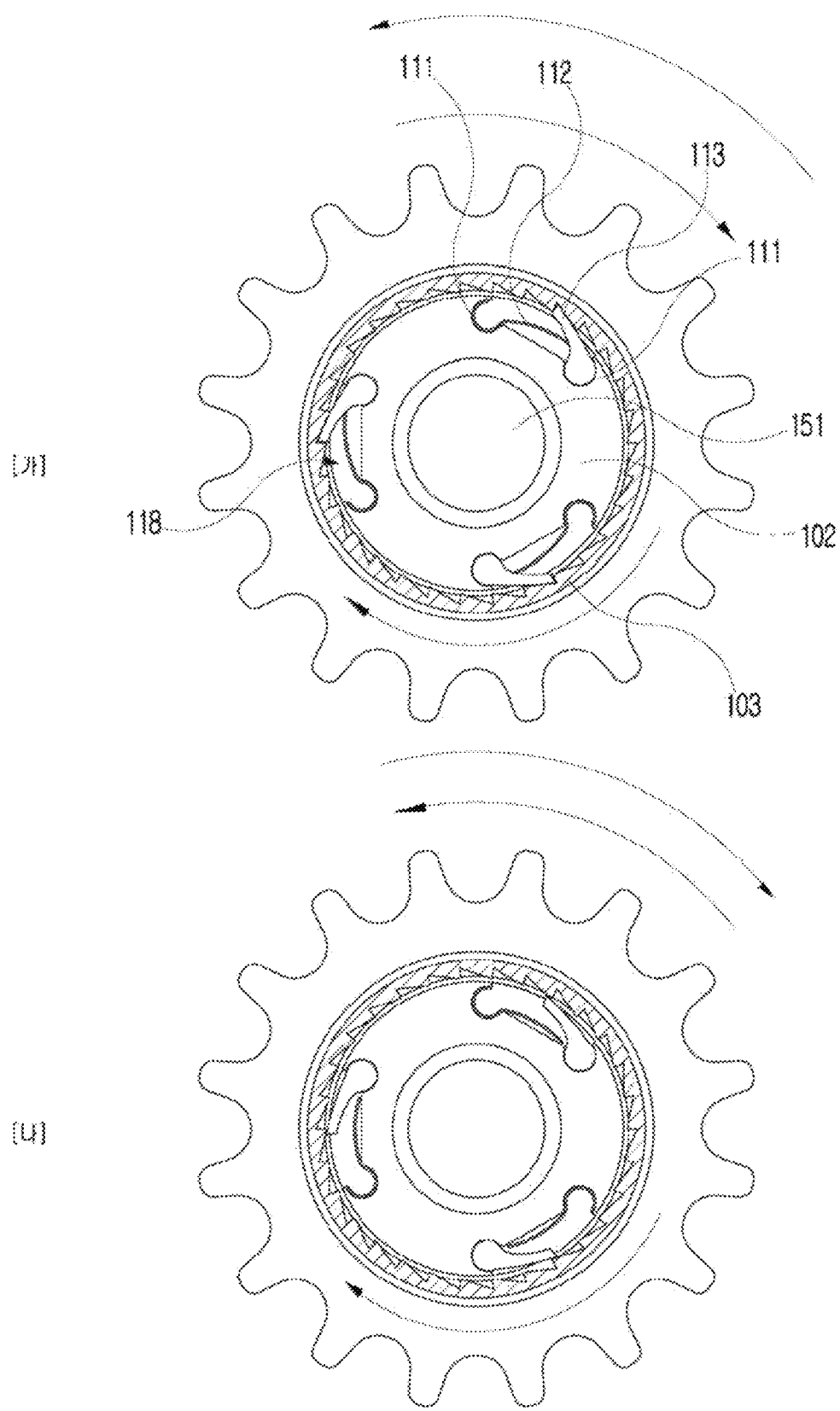
FIG. 14 is a ratchet unit according to another embodiment of the present invention.
Figure 15:
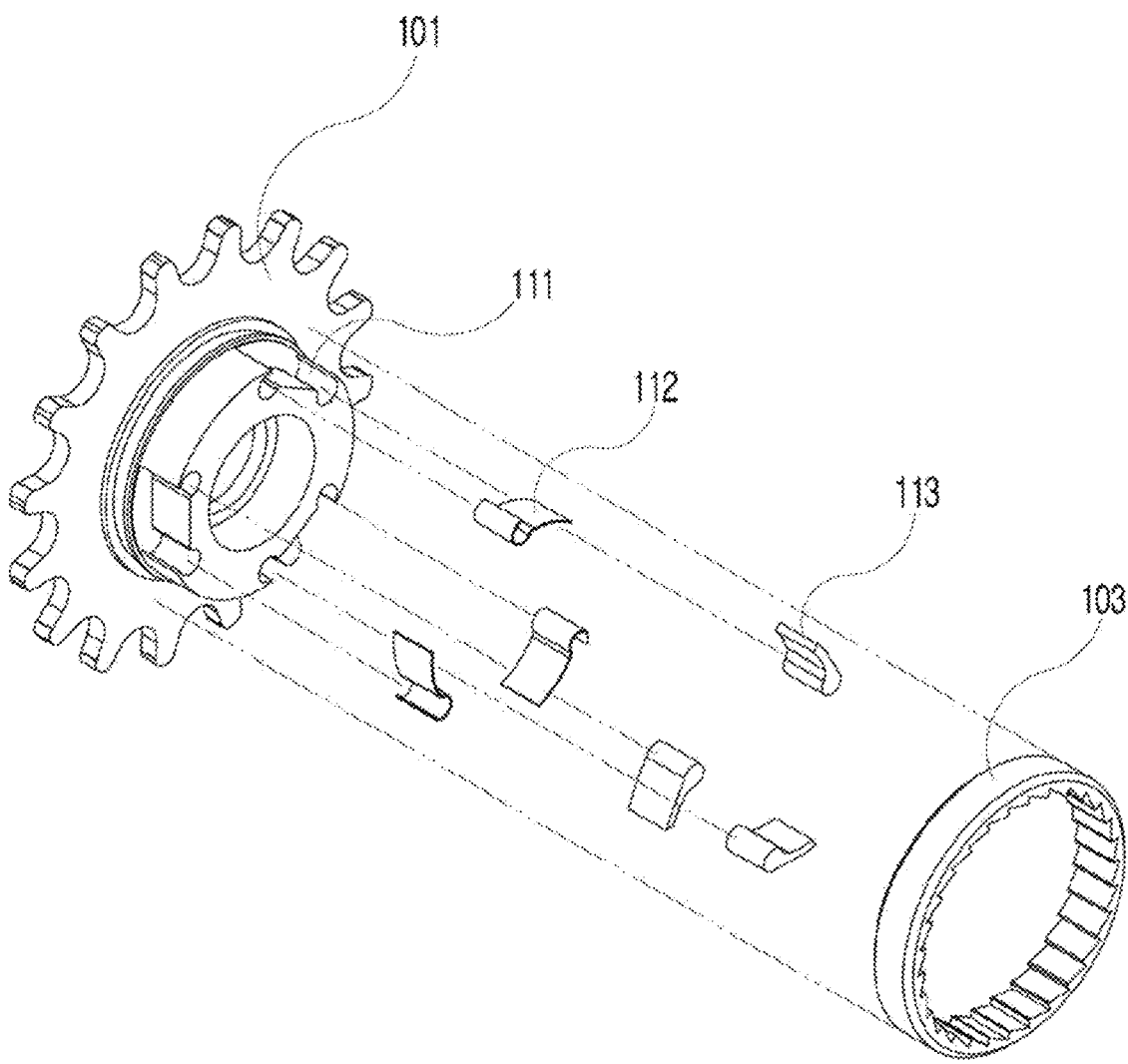
FIG. 15 shows an operation state of an elastic plate and a pawl of a ratchet unit according to an embodiment of the present invention.
Figure 16:
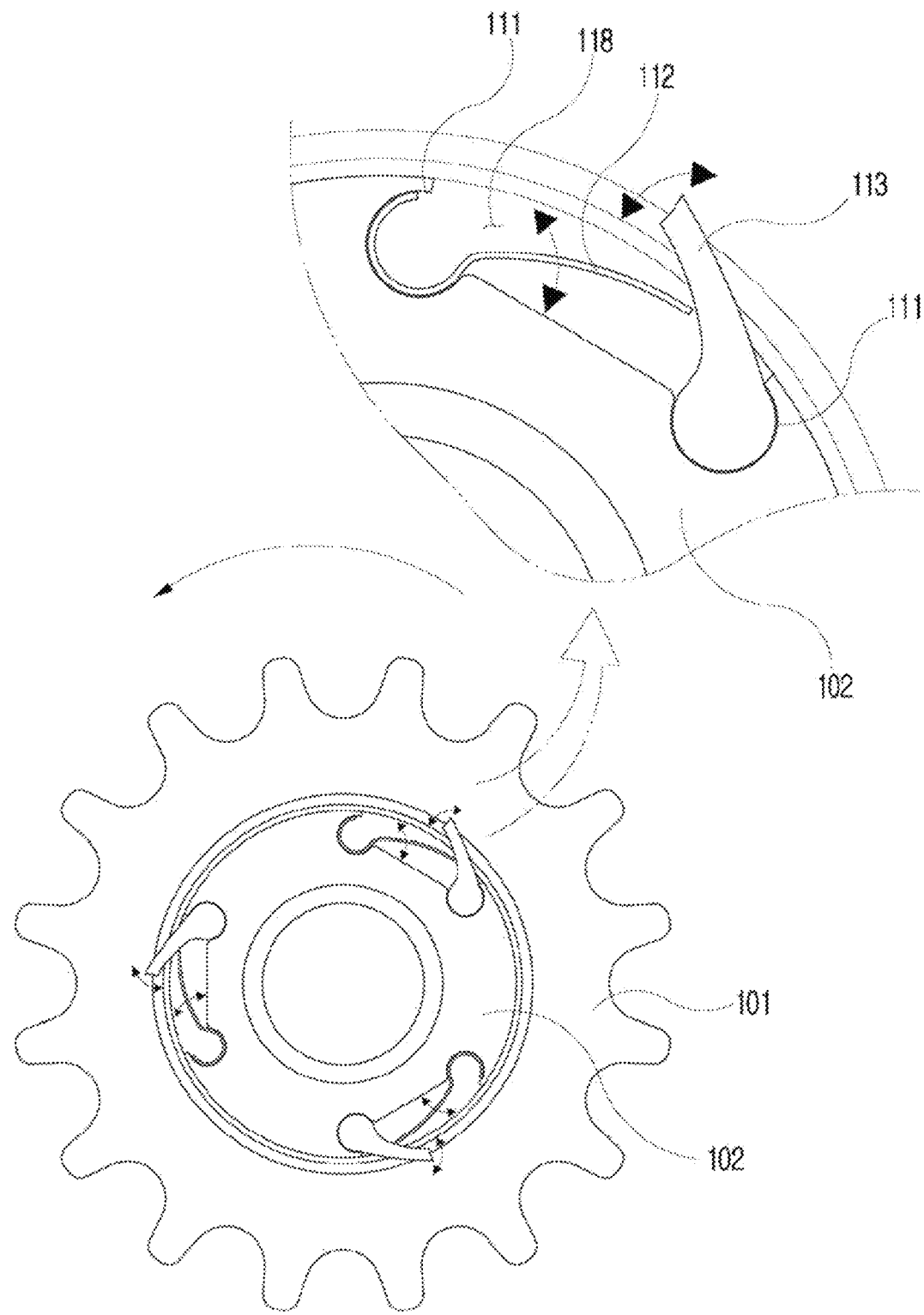
FIG. 16 also shows the operating state of the elastic plate and the pawl according to an embodiment of the present invention.
Figure 17:
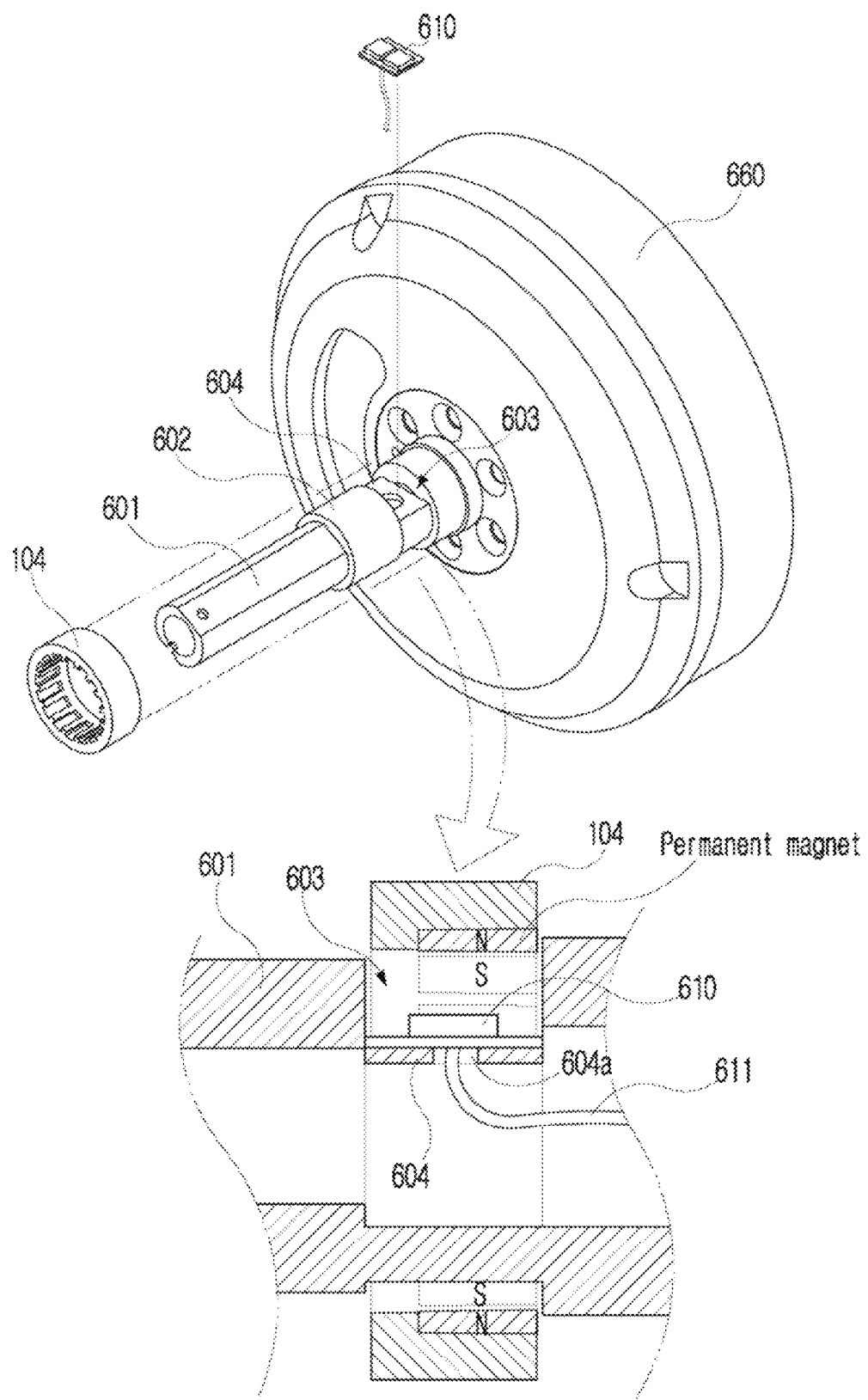
FIG. 17 shows a hall sensor installed in a support shaft according to an embodiment of the present invention.

As shown in FIG. 11 or 17, the support shaft rod (601) in a hollow tube shape is horizontally provided and controls power of the motor (660) for deceleration, stop, acceleration, and the like. The rotary shaft (602) is provided on the support shaft rod (601) and having a step. The support shaft rod (601) is provided adjacent to the rotary shaft (602). The engraved portion (603) is provided to form the sensor fixing groove (604). The rotary shaft (602) and the electrical signal conversion unit (104) are spaced apart from each other by a predetermined distance by the sensor fixing groove (604).

The magnets, which are installed in the contactless electric signal conversion unit (104), rotate in forward and reverse directions as the user's ratchet unit (10) rotates in forward and reverse directions, thereby generating a magnet signal. The hall sensor (610) measures and transmits the magnetic signal to the control module board (510) and controls the motor (660).

The rotary gear (605) is rotated by the motor (660). The planetary gear (630) is rotated by engaging with the rotary gear (605). The outer gear (395) is located outside the planetary gear (630). The rotary gear (605) rotates by at least one planetary gear (630) as the outer gear (395) rotates. The clutch (700) is provided to maintain a constant acceleration force of the rotary near (605) when the rotary gear (605) rotates and to allow the rotary near (605) to idle when no power of the motor (660) is necessary. The rotary plate (390) is integrally coupled with the outer gear (395) and rotates to drive the entire hub (30).

In order to provide users convenience and safe running, a separate measurement monitor capable of monitoring operation information of the driver (A) in real time or a wireless environment such as Bluetooth for mobile devices is provided in the control module board (510) to monitor real time information.

An external connection terminal (800) may be provided at one end or both ends of the supporting shaft rod (601) to enhance user convenience. The external connection terminal (800) may be a various type of connection terminal, an antenna for external communication connection, or a program input/output terminal.

The engaging groove (302) is formed in the hub (30) to prevent the cover plate (20) from being separated. The engaging groove (302) is engaged with the threaded portion (204) of the cover plate (20) in a threaded manner. The engaging groove (302) may be a left-handed or a right-handed tab in consideration of a rotating direction and an idling direction.

A pair of coupling groove (302) and a pair of the fixing bracket (310) are arranged in a symmetrical manner, and form the main body (380). The fixing bracket (310) is provided outside the coupling groove (302). The fixing grooves (301) are provided in the fixing bracket (310). The spokes are fixed to the coupling groove (302).

The rotary plate (390) formed on one side of the main body (380) transmits rotational power of the motor unit (60) through the outer gear (395) so that the wheels can rotate by electric power.

The clutch (700) is provided between the rotary plate (390) and the outer gear (395) for rotation and idling. The clutch (700) enables a normal operation possible while the motor (660) stops working.

While the present invention has been described in connection with some embodiments and drawings, it should be understood that this invention is not limited to the disclosed embodiments. Instead, various changes and modifications available to persons having an ordinary skill in the art are within the scope of this invention.

DESCRIPTION OF REFERENCE NUMERALS

A: Driver
C: Chain support
S: Saddle support
H: Wheel hub
10: Ratchet unit
20: Detachable cover plate
30 Hub
40: Battery or Detachable battery
50: Build-in case
60: Motor unit
70: Shield plate
215: Receiving block
302: Screw coupling groove
301: Fixing groove
310: Fixing bracket
410: First battery
420: Second battery
660: Motor

What is claimed is:

1. A battery-integrated driver comprising:
a wheel hub (H);
a rear side chain support (C) and a saddle support (S) of a bicycle which are coupled to each other at the wheel hub (H);
a hub (30) provided in the wheel hub (H) and coupled to a wheel rim through spokes, wherein a tire is installed on the wheel rim;
a driver (A) provided in the hub (30) and including an electric motor (660), wherein the electric motor (660) supplies electric power to rotate a wheel; and
a battery provided in the driver (A) in a detachable manner and driving the electric motor (660),
wherein the driver (A) includes:
a ratchet unit (10) detecting and inputting an operation signal generated by a forward/reverse rotation of a bicycle pedal;
a cover plate (20) having a receiving block (215), wherein an inner circumference of the ratchet unit (10) is rotatably coupled with the receiving block (215) of the cover plate (20);
a built-in case (50);
a control module board (510), wherein the built-in case (50) is provided on a first side of the cover plate (20) and housing a battery (40) and a control module board (510), wherein the battery (40) includes a first battery (410) and a second battery (420), wherein the cover plate (20) is openable and closable so that the battery (40) is installed in the built-in case (50) in an attachable and detachable manner, wherein the control module board (510) is installed in the built-in case (50) and includes a control program, wherein the control program senses the operation signal of the ratchet unit (10) to control the electric motor (660);
a motor unit (60) provided on a first side of the built-in case (50) and generating and transmitting power to the motor (660) for deceleration, stop, and acceleration, wherein the cover plate (20) and the ratchet unit (10) are coupled to a second side of the built-in case (50);
a main body (380) provided on the first side of the built-in case (50) and over the motor unit (60);
a clutch (700) provided in the main body (380); and
an outer gear (395) provided in the main body (380) and rotatably engaged with the motor unit (60).

2. The battery-integrated driver of claim 1, wherein the ratchet unit (10) comprises:
a ratchet block (102) having a first through hole (151);
a sprocket (101) fixedly installed on a first side of the ratchet block (102);
one or more pair of insertion groove (111) and operation groove (118) which is formed on an inner circumference of the sprocket (101);
an elastic plate (112) and a pawl (113) which are formed in the insertion groove (111) and engageable with each other,
a contactless electric signal conversion unit (104) inserted into a center of the sprocket (101); and
a ratchet gear shell (103) fitted to the pawl (113) and selectively engageable with the pawl (113).

3. The battery-integrated driver of claim 2,
wherein the contactless electric signal conversion unit (104) is coupled with the ratchet block (102) and controls an operation of the electric motor (660) using the control module board (510) of the driver (A) in accordance with the operation signal of the forward/reverse rotation of the bicycle pedal,
wherein N poles and S poles, which are formed of permanent magnet blocks, are provided on an inner circumference of the first through hole (151) of the ratchet block (102), arranged in an alternate manner, and spaced apart from each other by a predetermined distance.

4. The battery-integrated driver of claim 3,
wherein the contactless electric signal conversion unit (104) converts a stop signal, a deceleration signal, or an acceleration signal and transmits the converted signal to the control module board (510) depending on operating environment and operating requirements using an optical sensor, a ultrasonic sensor, or a proximity sensor.

5. The battery-integrated driver of claim 1, wherein the cover plate (20) comprises:
a first rotary plate (250);
the receiving block (215) formed in the first rotary plate (250) and receiving a ratchet gear shell (103) of the ratchet unit (10);

a threaded portion (204) formed on an outer circumference of the first rotary plate (250);

a detachable groove (209) formed at an eccentrical location of the threaded portion (204);

a latching protrusion (207) and a latching lever (203) formed in the detachable groove (209); and a detachable battery protecting lid (201) engageable with the latching protrusion (207) and the latching lever (203).

6. The battery-integrated driver of claim 1, wherein the built-in case (50) comprises:

a partition plate (504) securely accommodating the control module board (510);

a holding plate (503) securely accommodating the battery (40);

one or more fixing bracket (501, 502) provided adjacent to the holding plate (503) to prevent detachment of the battery (40);

a cooling space groove (520) formed adjacent to the partition plate (504); and heat dissipation holes (522) formed in a wall surface (521) of the cooling space groove (520).

7. The battery-integrated driver of claim 1, wherein the control module board (510) comprises:

a motor control unit (not shown) controlling a driving operation of the hub (30) which is rotated by the electric motor unit (60);

a wireless communication unit (not shown) transmitting an operation status of the electric motor unit (60) and operation information of the control module board (510) via a remote local Bluetooth network or a WiFi network; and the control program, wherein the control program checks and diagnoses a status of the motor control unit and a status of the wireless communication unit, wherein the motor control unit (not shown), the wireless communication unit (not shown), and the control program are wirelessly controlled by a mobile or a tablet device using the wireless communication unit (not shown).

8. The battery-integrated driver of claim 1, wherein the electric motor unit (60) includes:

a support shaft rod (601) formed in a hollow tube shape;

a rotary shaft (602) provided on the support shaft rod (601) in a stepped shape;

an engraved portion (603) provided adjacent to the rotary shaft (602) to form a sensor fixing groove (604);

a second through hole (604*a*) formed in the sensor fixing groove (604);

a hall sensor (610) inserted into the second through hole (604*a*) and connected to a first end of a wiring (611);

the control module board (510) coupled to a second end of the wiring (611);

the electric motor (660) coupled to the support shaft rod (601);

a rotary gear (605) provided at a center region of the electric motor (660);

a planetary gear (630), wherein the rotary gear (605) and the planetary gear (630) are arranged side by side; and a fixing shaft rod (640) fixed to the planetary gear (630).

9. The battery-integrated driver of claim 8, wherein the supporting shaft rod (601) includes an external connection terminal (800), wherein the external connection terminal (800) is:

a battery charging terminal (not shown) charging the battery (40) by an external power source;

a wireless communication unit antenna (not shown) connected with a mobile or a tablet device for external remote control; or a terminal (not shown) for diagnosing a state of the electric motor unit (60) and inputting/outputting the control program.

10. The battery-integrated driver according to claim 1, wherein the hub (30) comprises:

the main body (380) including a fixing bracket (310);

an engaging groove (302) formed on the fixing bracket (310) and engageable with a threaded portion (204), wherein the threaded portion (204) is formed on an outer circumference of a first rotary plate (250) of the cover plate (20);

spoke fixing grooves (301) formed along an outer circumference of the engaging groove (302) and arranged in a circular manner; and a second rotary plate (390) forming a first side of the main body (380), wherein the clutch (700) is shafted and fixed to the second rotary plate (390) and includes a guide rail (702) and one or more rollers (701), wherein the one or more rollers (701) move along a guide rail (702), wherein the outer gear (395), which transmits power, and a planetary gear (605) of the motor unit (60) rotate or idle while being engaged with an outer circumference of the clutch (700).

* * * * *